United States Patent Office 2,726,221
Patented Dec. 6, 1955

2,726,221

GOLF BALL COVER COMPOSITION

Stephen T. Semegen, Cuyahoga Falls, and Richard A. Crawford, Akron, Ohio, assignors to The B. F. Goodrich Company, New York, N. Y., a corporation of New York No Drawing. Application November 29, 1949, Serial No. 130,071

4 Claims. (Cl. 260—23.7)

This invention relates to golf ball cover compositions and especially to compositions comprising a blend of rubbery material with a tough resinous material.

It is an object of this invention to provide compositions suitable for golf ball covers which have the necessary physical properties such as "click," resistance to cutting, toughness, and processibility.

It is a further object to provide such a composition more economically than the compositions conventionally used.

It is an object to provide compositions which may or may not be vulcanized.

Other objects will be apparent from the description which follows.

We have discovered that a blend of a rubbery material with a tough, thermoplastic, horny, resinous material such as a copolymer of an aryl olefin and a butadiene-1,3 hydrocarbon is very suitable for golf ball cover compositions. Golf ball compositions must have certain requisite physical properties which include easy processing, good shell-forming characteristics, good final molding characteristics, and good rebound, driving distance, cut resistance and "click."

The preferred compositions are homogeneous mixtures of (A) a tough, horny, resinous polymeric material having a softening point of from about 150 to 300° F., and (B) a soft rubbery material. These preferred compositions have also been blended with balata compositions to provide good covers.

The tough, horny constituent may be a synthetic resinous material comprising a polymerization product of a minor proportion by weight of a butadiene-1,3 hydrocarbon and a major proportion of a copolymerizable compound containing a single ethylenic unsaturation, such as a vinyl pyridine, a styrene including methyl styrene, chloro and dichloro styrene, methoxy styrene, and similar aryl olefins and substituted aryl olefins, ether alone or in admixture with balata.

Any butadiene-1,3 hydrocarbon may be used, preferably one containing four to eight carbon atoms as, for example, butadiene-1,3; isoprene; 2,3-dimethyl butadiene-1,3; piperylene; 2-ethyl butadiene-1,3; and the like.

The second polymerizable compound may be a 2-vinyl pyridine such as a nuclear alkyl substituted 2-vinyl pyridine or 2-vinyl pyridine itself. The alkyl 2-vinyl pyridine compounds which may be used are typified by 5-ethyl 2-vinyl pyridine; 4,6-dimethyl 2-vinyl pyridine; 5-methyl 2-vinyl pyridine; 4,6-diethyl 2-vinyl pyridine and similar alkyl 2-vinyl pyridines in which the alkyl groups contain less than 10 carbon atoms.

Also, the second polymerizable compound may be styrene (vinyl benzene, methyl styrene) ortho, meta, para, alpha, or beta p-methoxy styrene, p-chloro styrene, ortho chloro styrene, 1-vinyl 2,4-dichloro benzene, p-chloro alpha-methyl styrene, 1-vinyl 4-chloro naphthalene, 1-vinyl 2-chloro naphthalene, or other similar compounds.

The resinous copolymer is preferably made by copolymerizing a mixture of monomers consisting of 60 to 90% by weight of an aromatic olefin such as styrene or vinyl pyridine and 10 to 40% of a butadiene-1,3 hydrocarbon. These copolymers are tough and horny instead of being rubbery as are the copolymers containing greater proportions of the butadiene-1,3 hydrocarbon.

The rubbery component may be a rubbery polymer of butadiene-1,3 with styrene. Such rubbery material contains 50% by weight of the conjugated diolefin.

Other ingredients may be added to the composition, among which are any of the long-chain synthetic polymeric amides, cyclicized rubber, polyethylene, etc.; and the rubbery material may be added in glue-rubber mixtures, the glue being preferably a pearl-type animal glue. Other usual rubber compounding ingredients including accelerators and vulcanizing agents may be added as desired. Specific examples of our invention are as follows:

Example I

A resinous copolymer of styrene and butadiene-1,3 is prepared from the following recipe in which the parts are by weight:

| | Parts |
|---|---|
| Butadiene-1,3 | 60 |
| Styrene | 340 |
| Dodecyl mercaptan | 2 |
| Sodium stearate | 20 |
| Potassium persulfate | 1.2 |
| Water | 720 |

The potassium persulfate is dissolved in a portion of the water to form a 3% solution, and the sodium stearate is dissolved in the remaining water. The solutions are then mixed and poured into a polymerization vessel. The dodecyl mercaptan is dissolved in the styrene and added to the mixture, and the butadiene-1,3 is introduced last. The mixture is polymerized with constant agitation. The resultant latex is coagulated using conventional methods and the crumbs washed and dried. The resin obtained is a light brown, horny material which mills smoothly. This resin is then mixed with a 50:50 rubbery butadiene-1,3: styrene copolymer prepared by using the same polymerization procedure as above with a 200:200 ratio of monomers. The recipe for the resin-rubber composition is as follows, the parts being by weight:

| | Parts |
|---|---|
| 85:15 styrene butadiene-1,3 copolymer | 32.2 |
| 50:50 butadiene-1,3 styrene copolymer | 21.3 |
| Pearl-type animal glue | 17.1 |
| Zinc oxide | 1.9 |
| Sulfur | 1.1 |
| Titanium dioxide | 4.4 |
| Zinc stearate | 1.6 |
| N-pentamethylene ammonium pentamethylenedithiocarbamate | 0.2 |

The resinous and rubbery copolymers are mixed on a mill and the other ingredients are added in the usual manner. The stock is cut from the mill and pieces of the sheet stock are cut and placed in golf ball cover shell molds and by application of heat and pressure semi-spherical shells are produced.

After these shells are trimmed, conventional golf ball centers are inserted between pairs of shells and the whole placed in a mold and cured for eight minutes at 212° F. The balls are then cooled while in the mold, unloaded, buffed and painted.

Example II

The resinous 85:15 styrene: butadiene-1,3 copolymer of Example I was blended with a 50:50 rubbery butadiene-1,3: styrene copolymer as follows:

| | Parts |
|---|---|
| 85:15 styrene and butadiene-1,3 copolymer | 35 |
| 50:50 styrene and butadiene-1,3 copolymer | 25 |
| Zinc stearate | 3 |
| Zinc oxide | 4 |
| Titanium dioxide | 3 |

These ingredients are mixed on conventional rubber machinery and processed into golf ball covers substantially as in Example I.

*Example III*

The following materials may be conveniently mixed on conventional rubber machinery:

| | Parts by weight |
|---|---|
| 85:15 resinous styrene: butadiene-1,3 copolymer | 35 |
| 50:50 rubbery butadiene-1,3: styrene copolymer | 25 |
| Zinc stearate | 3 |
| Zinc oxide | 4 |
| Titanium dioxide | 3 |

Fifty parts of this material are then blended with 50 parts of the following balata cover composition:

| | Parts by weight |
|---|---|
| Balata | 44 |
| Crude rubber | 22 |
| Pearl-type animal glue | 22 |

These constituents are blended on a mill, stamped and molded, and the shells used to cover balls as described in Example I.

The balls made with the cover compositions of Examples I and II were tested on a driving range by being propelled by mechanical means. The yardage of the drive is compared with that of a control ball having a balata cover because the distance achieved depends upon atmospheric conditions such as temperature, wind velocity, etc.

| Example No. | Initial Velocity | Distance in Yards | |
|---|---|---|---|
| | | New | Control |
| 1 | 105 | 235.5 | 235 |
| 2 | 93 | 203 | 200 |

These driving tests show that balls with covers of the compositions of this invention are as good or slightly better than balata covered control balls of No. 1 grade. The cut-resistance also compares favorably with that of the control ball. The tensile strength and elongation of the cover composition approximates that of the balata cover.

As the examples indicate the rubbery polymer component may vary from about 50% to about 200% by weight of the resinous component. The rubbery polymer component may be added alone or in admixture with up to twice its weight of pearl-type animal glue, preferably with from 30% to 100% of glue by weight of the rubber. The cyclicized rubber and long-chain polyamide may be added in any amount up to the full amount of the resinous component. Some of these examples have shown accelerators added; however, accelerators are not necessary if the compounds are not to be vulcanized. These compositions may be prepared without any accelerator, formed into half shells, and pressed about golf ball centers by the application of heat and pressure. This method obviates the curing period which is an economic advantage in itself and gives very good covers having the requisite properties. Heat is needed in the molding of the covers but no curing period of from three to ten minutes is necessary.

Our invention is not limited by the specific examples listed herein for illustration. Rather the invention covers blends of a rubbery component and a hard resinous component as defined in the following claims.

We claim:

1. A composition of matter useful in the manufacture of golf ball covers comprising as essential ingredients a tough, horny, resinous copolymer comprising from 60 to 90% by weight of a monomeric compound having a single ethylenic unsaturation and from 40 to 10% by weight of a butadiene-1,3 hydrocarbon and a rubbery copolymer comprising 50 parts by weight of monomeric styrene and 50 parts by weight of monomeric butadiene-1,3, said rubbery copolymer being present in an amount of from 50 to 200% by weight of said resinous copolymer.

2. A composition of matter useful in the manufacture of golf ball covers comprising as essential ingredients a tough, horny, resinous copolymer consisting essentially of 85 parts by weight of monomeric styrene and 15 parts by weight of monomeric butadiene-1,3 and a rubbery copolymer consisting essentially of 50 parts by weight of monomeric styrene and 50 parts by weight of monomeric butadiene-1,3, said rubbery copolymer being present in an amount of from 50 to 200% by weight of said resinous copolymer.

3. A composition of matter useful in the manufacture of golf ball covers comprising as essential ingredients a tough, horny, resinous copolymer consisting essentially of 85 parts by weight of monomeric styrene and 15 parts by weight of monomeric butadiene-1,3 and a rubbery copolymer consisting essentially of 50 parts by weight of monomeric styrene and 50 parts by weight of monomeric butadiene-1,3, said rubbery and said resinous copolymers being present in about equal parts by weight.

4. A composition of matter useful in the manufacture of golf ball covers consisting essentially of 35 parts of 85:15 styrene and butadiene-1,3 hard, tough, resinous copolymer, 25 parts of 50-50 styrene and butadiene-1,3 rubbery copolymer, 3 parts of zinc stearate, 4 parts of zinc oxide, and 3 parts of titanium dioxide, all parts being by weight.

References Cited in the file of this patent

UNITED STATES PATENTS

| 2,541,748 | Daly | Feb. 13, 1951 |
| 2,643,125 | Juve | June 23, 1953 |

OTHER REFERENCES

Borders et al.: Pp. 955 to 958, September 1946, Ind. & Eng. Chem.

Aiken: Pages 99–103, October 1948, Modern Plastics.

The Vanderbilt Rubber Handbook, 1948, pages 248–255.